United States Patent [19]

Bose

[11] 4,409,534
[45] Oct. 11, 1983

[54] MICROCOMPUTER-BASED PULSE WIDTH MODULATED INVERTER FED MACHINE DRIVE SYSTEM

[75] Inventor: Bimal K. Bose, Latham, N.Y.

[73] Assignee: General Electric Company, Schenectady, N.Y.

[21] Appl. No.: 328,164

[22] Filed: Dec. 7, 1981

Related U.S. Application Data

[63] Continuation of Ser. No. 138,537, Apr. 9, 1980, abandoned.

[51] Int. Cl.³ .......................... H02P 5/40; H02P 7/44; H02P 7/58
[52] U.S. Cl. ............................... 318/811; 318/345 E; 318/722; 318/723
[58] Field of Search ................................ 318/807–812, 318/345 E, 599, 722, 723; 363/41, 42; 307/265

[56] References Cited

U.S. PATENT DOCUMENTS

| | | | |
|---|---|---|---|
| 4,047,083 | 9/1977 | Plunkett | 318/807 |
| 4,099,109 | 4/1978 | Abbondanti | 318/811 |
| 4,290,108 | 9/1981 | Woehrle | 318/810 |
| 4,348,734 | 9/1982 | Dougherty | 363/41 |

Primary Examiner—David Smith, Jr.
Attorney, Agent, or Firm—William H. Steinberg; James C. Davis, Jr.; Marvin Snyder

[57] ABSTRACT

Regulation of inverter-machine drive system torque and frequency in accordance with operator commands is achieved by the use of an improved, microcomputer-based, control apparatus. At machine frequencies less than a preselected machine frequency, inverter pulse width modulation signal pulses and half cycle polarity signal pulses are supplied by the control apparatus to the inverter to regulate the duration and conduction sequence, respectively, of inverter switching devices in accordance with pulse width modulation signal data computed by equilateral triangulation and stored half cycle polarity signal data. At frequencies above the preselected machine frequency, when computation of inverter pulse width modulation signal data becomes impractical, inverter pulse width modulation signal pulses are synthesized from stored data. This achieves simplification of control hardware and provides improved machine drive system performance.

5 Claims, 13 Drawing Figures

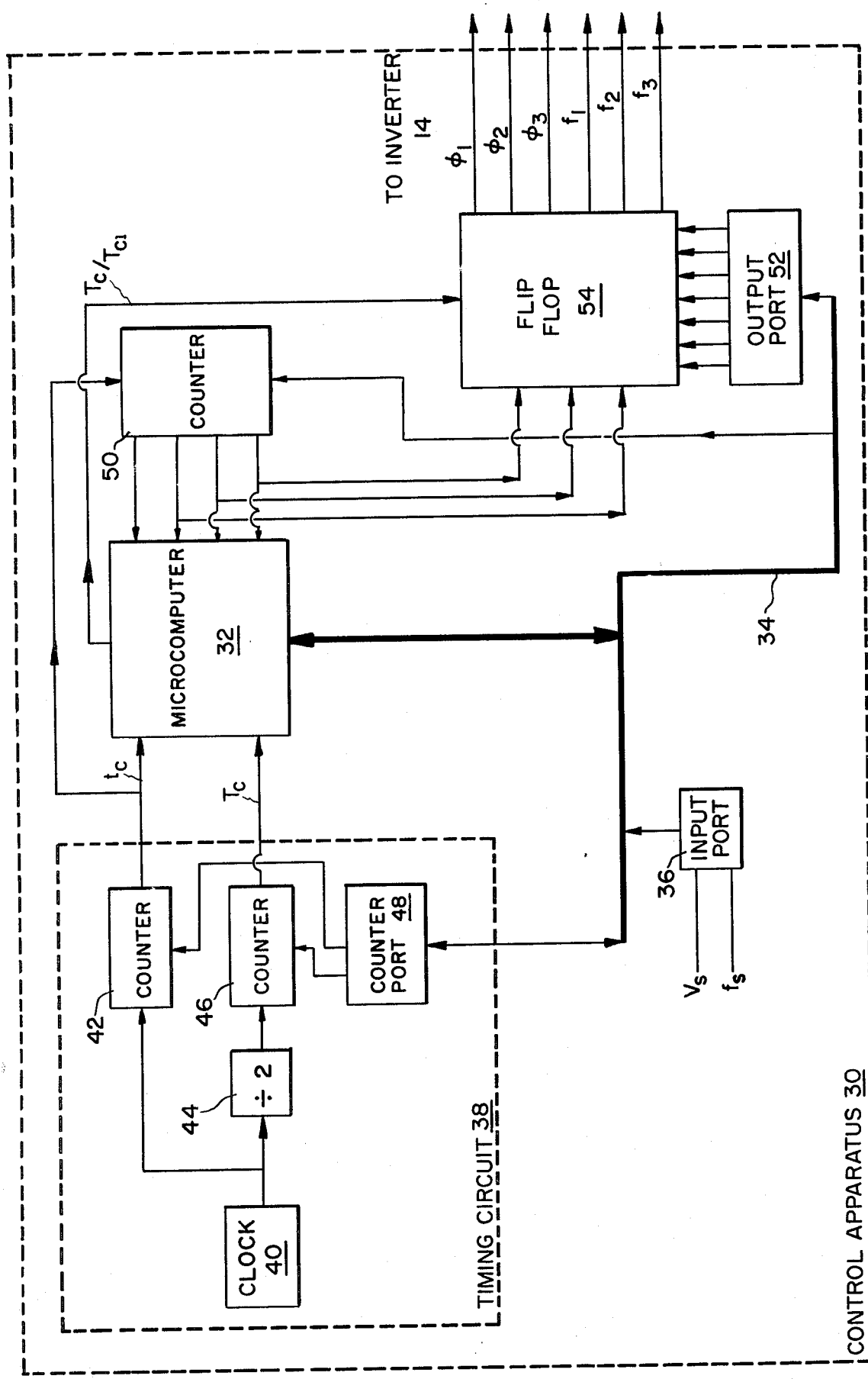

MICROCOMPUTER-BASED PULSE WIDTH MODULATED INVERTER FED MACHINE DRIVE SYSTEM

This application is a continuation of application Ser. No. 138,537 filed Apr. 9, 1980 now abandoned.

BACKGROUND OF THE INVENTION

This invention relates generally to inverter-fed machine drive systems, and more specifically, to an improved microcomputer-based control apparatus for controlling inverter switching device conduction in accordance with operator commands to achieve improved regulation of machine torque and frequency.

The ability to control the torque and frequency of a polyphase alternating current machine of either the synchronous or induction type is very useful. Often, it is desirable to adjust machine frequency and torque in response to rapidly changing load conditions. Since the torque and frequency of a polyphase alternating current machine are dependent on the amplitude and frequency of machine terminal voltage, conditioning, that is, varying the amplitude and frequency of machine terminal voltage in accordance with external commands allows machine torque and frequency to be regulated accordingly.

Conditioning of the alternating current supplied to a polyphase alternating current machine is commonly accomplished by use of a power converter, such as an inverter coupled between a low frequency, (e.g. 0-60 Hz.) potential source and the polyphase machine. Typically, the inverter comprises a plurality of pairs of switching devices, either high current transistors or thyristors, with the switching devices of each pair coupled in series aiding fashion, and each of the pairs coupled across the low frequency potential source and coupled at the junction between serially coupled switching devices, respectively, to an associated machine phase, respectively. When the switching devices of each of the pairs are rendered conductive in a prescribed sequence, alternating current is supplied to the machine causing it to become excited and commence rotation. By controlling the conduction duration of each of the inverter switching devices, the amplitude of power converter output voltage can be regulated accordingly. Control of the frequency at which the power inverter switching devices are rendered conductive allows control of machine frequency.

Heretofore, various techniques have been described for controlling inverter switching device conduction duration and frequency. The most common is that of pulse width modulation, often abbreviated as PWM, whereby the switching devices of each inverter pair are alternately rendered conductive, and the pairs of switching devices in the inverter are switched, in sequence, at a frequency greater than twice the desired machine frequency. Rendering the inverter switching devices conductive in this manner results in each phase component of inverter output voltage exhibiting a waveform comprised of a series of alternately positive and negative pulses. The width of pulses is proportional to the output voltage magnitude and the fundamental frequency of the pulse waveform is proportional to inverter output frequency.

In the past, pulse width modulation control of inverter switching device conduction has been accomplished by use of dedicated analog or digital hardware. Unfortunately, such dedicated hardware is usable only in conjunction with a selected class of alternating current machine drive systems for which the hardware was designed. To adapt such dedicated hardware to different classes of machine drive systems is often time-consuming, if possible at all.

In contrast, the present invention concerns an improved, microcomputer-based, control apparatus for a machine drive system which achieves pulse width modulation inverter operation with considerable simplification in hardware. The present invention may also be adapted for use on different classes of machine drive systems with only a modification of microcomputer software.

It is an object of the present invention to provide a microcomputer-based control apparatus for an inverter-fed machine drive system which regulates machine frequency and torque;

It is another object of the present invention to provide a microcomputer-based control apparatus for an inverter-fed machine drive system which regulates the duration and sequence of inverter switching device conduction in accordance with inverter pulse width modulation signal pulses and half cycle polarity signal pulses, the inverter pulse width modulation signal pulses data produced by equilateral trangulation during intervals of low machine frequency and by synthesis from discrete stored wave patterns selected in accordance with either the selected harmonic elimination method or the machine ripple current minimization method during intervals of other than low machine frequency, thereby assuring smooth regulation of machine torque and frequency.

BRIEF SUMMARY OF THE INVENTION

Briefly, in accordance with a preferred embodiment of the invention, an improved control apparatus for an inverter fed machine drive system for regulating inverter switching device conduction to control machine drive system torque and frequency comprises a timing circuit for generating a first interrupt signal at uniform periodic intervals which vary in duration in accordance with an operator-commanded machine frequency and a second interrupt signal at uniform periodic intervals which vary in duration in accordance with the period of said first interrupt signal. A processor, typically comprised of a microcomputer, is coupled to the timing circuit and during each interrupt interval, that is, the period between successive occurrence of first interrupt signal from the timing circuit, the processor means produces half cycle polarity signal pulses and pulse width modulation signal pulses to regulate the sequence of inverter switching device conduction and the conduction duration of each switching device, respectively. The pulse width modulation signal pulses generated by the processor are produced by equilateral triangulation during intervals of low machine frequency in accordance with the periodic occurrence of the second interrupt signal produced by the timing circuit. During intervals other than low machine frequency, the processor synthesizes the pulse width modulation signal pulses from a set of discrete stored word strings, the word strings being selected such that the pulse width modulation signal pulses synthesized therefrom are optimized in accordance with either the selected harmonic elimination method or the rms machine ripple current minimization method. The half cycle polarity signals are generated by the processor from stored polarity data contained in the processor means memory. A storage device is coupled to the processor and stores the pulse width modulation signal pulses and the half cycle polarity signal pulses produced by the processor during each interrupt interval. During each subsequent interrupt interval, the storage device releases pulse width modulation signal pulses and half cycle polarity signal pulses stored therein during the preceding interrupt interval to the inverter which, in response, regulates the conduction duration and conduction sequence of inverter switching devices, to adjust machine frequency and torque as desired.

BRIEF SUMMARY OF THE DRAWINGS

The features of the invention believed to be novel are set forth with particularity in the appended claims. The invention itself, together with further objects and advantages thereof, may best be understood by reference to the following description taken in conjunction with the accompanying drawings in which:

FIG. 1b is a block diagram of the control apparatus comprising a portion of the machine drive system of FIG. 1;

DETAILED DESCRIPTION OF THE PREFERRED EMBODIMENT

Figure 1A:
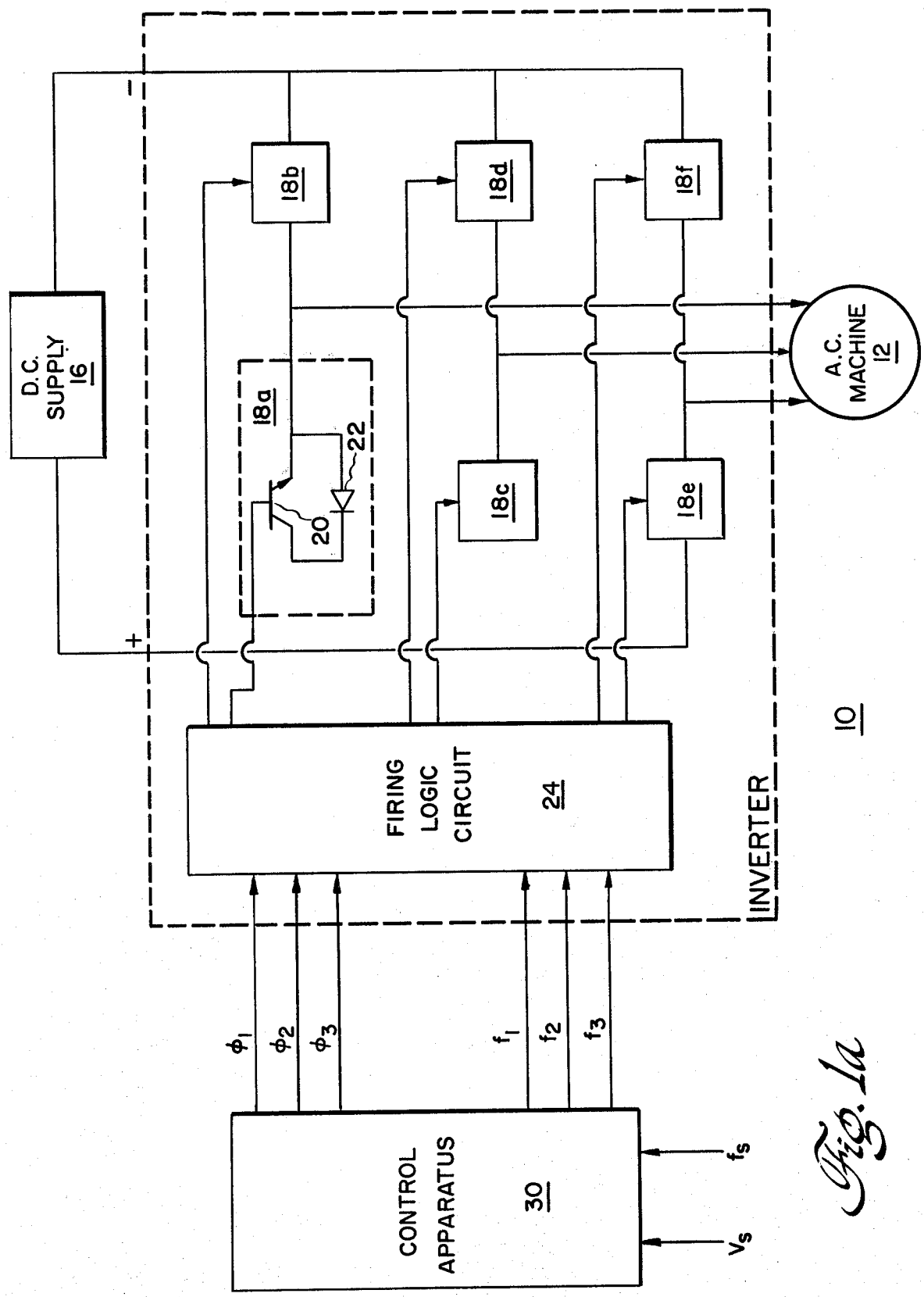
FIG. 1a is a part schematic, part block diagram of a microcomputer controlled inverter fed machine drive system.

FIG. 1 illustrates a microcomputer-controlled inverter-fed machine drive system 10 according to the present invention. Drive system 10 comprises a multiphase alternating current machine 12, which is energized with variable frequency, variable amplitude alternating current supplied from an inverter 14 that is powered with direct current provided by a direct current supply 16, typically comprised of a phase controlled rectifier. The structure of inverter 14 is dependent on the number of phases of machine 12. With machine 12 configured as a three phase machine of either the synchronous or induction type, inverter 14 comprises a three phase bridge inverter configured of three pairs of controlled switching devices 18a and 18b, 18c and 18d, and 18e and 18f, respectively, the switching devices of each pair being coupled in series-aiding fashion and each of the pairs of switching devices coupled across direct current supply 16. The junction between switching devices of each pair is coupled to a respective one of three phases of machine 12. In practice, each of switching devices 18a–18f, such as 18a, for example, comprises a high current transistor 20 with the collector-to-emitter portion coupled between one of the terminals of direct current supply 16 and one of the phases of machine 12. Coupled in parallel opposition across the collector-emitter portion of transistor 20 is a diode 22 which provides a reverse path for machine currents. Those skilled in the art will recognize that a thyristor, together with a suitable commutation circuit, could easily be substituted for the combination of transistor 20 and diode 22.

To supply machine 12 with alternating currents in a proper three phase relationship, the switching devices of each pair of inverter switching devices are alternately rendered conductive, and the pairs of switching devices are switched in sequence at a frequency greater than twice the desired machine frequency by a firing logic circuit 24. Firing logic circuit 24 is responsive to pulse width modulation signal pulses $f_1$, $f_2$ and $f_3$ and half cycle polarity signal pulses $\phi_1$, $\phi_2$ and $\phi_3$ produced by a control apparatus 30 described in greater detail below with respect to FIG. 1b. The polarity of each of half cycle polarity signal pulses $\phi_1$, $\phi_2$ and $\phi_3$ regulates the conduction sequence of the switching devices of a separate one of the three pairs of inverter switching devices, respectively, that is to say, which device of each pair is first rendered conductive. The switching devices of each pair are alternately rendered conductive by firing logic circuit 24, with each switching device of each pair remaining conductive for an interval proportional in duration to the width or duration of a separate one of pulse width modulation signal pulses $f_1$, $f_2$ and $f_3$, respectively.

The structure of firing logic circuit 24 is dependent on the configuration of each of inverter switching devices 18a–18f. Where, as in the presently preferred embodiment, each of inverter switching devices 18a–18f comprises a high current transistor, then firing logic circuit 24 will typically comprise three pairs of base drive cicuits, each base drive circuit controlling the conduction of a corresponding inverter switching device. In practice, each of the base drive circuits of firing logic circuit 24 is configured of a type well known in the art.

Referring now to FIG. 1b, control apparatus 30 comprises a microcomputer 32, typically a model 8086 microcomputer such as manufactured by Intel Corporation. Microcomputer 32 is coupled via a data bus 34 to an input port 36, typically an Intel model 8255 port, and is supplied from input port 36 with an 8 bit voltage command $v_s$, varying in accordance with an operator-commanded inverter output voltage amplitude $V_S$, and a 16 bit frequency command $\omega_s$, varying in accordance with an operator-commanded machine frequency $f_2$. The voltage command $V_s$ and frequency command $\omega_s$ are supplied to input port 36 from an external circuit (not shown). In accordance with the operator command frequency $f_s$, microcomputer 32 supplies a timing circuit 38 (described hereinbelow), coupled to microcomputer 32 via data bus 34, with a pair of words $w_{Tc}$ and $w_{tc}$, and in accordance therewith, timing circuit 38 periodically supplies the microcomputer with a pair of interrupt signals $T_c$ and $t_c$, respectively, every $|T_c|$ and $|t_c|$ seconds, respectively.

Timing circuit 38 typically comprises a highly accurate 40 MHz clock which supplies a clock signal every $0.025\mu$ seconds to a 16 bit programmable counter 42, typically a model 74S161 counter, such as manufactured by Texas Instruments, and to divide-by-two gate 44. The output clock signal produced by gate 44 is supplied to a 20 bit programmable counter 46, also configured a mode 74S161 counter. Each of counters 42 and 46 is also coupled to a counter port 48, typically an Intel Model 8255 port, which port, is coupled to microcomputer 32 via data bus 34. Counter port 48 retains timing words $w_{Tc}$ and $w_{tc}$ produced by microcomputer 32 and, when the register of a respective one of counters 46 and 42 is empty, counter port 48 transmits a respective one of timing words $w_{Tc}$ and $w_{tc}$ thereto for loading into the counter register. During intervals when the register of counter 42 is not empty, the counter register is decremented every time clock 40 produces a clock signal. When the register of counter 42 is empty, counter 42 transmits an interrupt signal $t_c$ to microcomputer 32. In a similar fashion, counter 46 decrements the contents of its register every time divide-by-two gate 44 generates an output signal and when the contents of the counter register equals zero, counter 46 supplies microcomputer 32 with interrupt signal $T_c$. Generation of interrupt signals $t_c$ and $T_c$ in this manner assures their occurrence every $|t_c|$ and $|T_c|$ seconds, respectively.

Microcomputer 32 is also coupled via data bus 34 to a four register counter 50, typically comprised of a pair of Intel Corp. Model 8253 counters. Each time microcomputer 32 is supplied with a $T_c$ interrupt signal from timing circuit 38, the microcomputer supplies three words to counter 50, each representing a successive waveform portion of a respective one of the three phase components of desired inverter output voltage. Each of the three words is loaded into one of the first three counter registers, respectively. The three counter registers are decremented simultaneously every $|t_c|$ seconds in accordance with interrupt signal supplied to the counter from timing circuit 38. When each of the first three registers of counter 50, each containing one of the three words, respectively, becomes empty, counter 50 generates each of three clock signals $C_1$, $C_2$ and $C_3$, respectively, which are supplied to microcomputer 32. In response to clock signals $C_1$, $C_2$ and $C_3$ microcomputer 32 generates each of inverter pulse width modulation signal pulses $f_1$, $f_2$ and $f_3$, respectively, and each of half cycle polarity signal pulses $\phi_1$, $\phi_2$ and $\phi_3$, respectively. In addition, when each of the first three counter registers becomes empty, microcomputer 32 supplies counter 50 with each of three new words, each new word representing the next successive waveform segment of a respective one of the three phase components of desired inverter output voltage.

During each interrupt interval, that is to say, during each period between successive $T_c$ interrupt signals from timing circuit 38, microcomputer 32 also supplies a word $w_{Tc1}$ to counter 50 which is then loaded into the fourth counter register. The fourth register of counter 50 is decremented simultaneously with the other three counter registers every $t_c$ seconds. When the fourth counter register becomes empty, counter 50 supplies microcomputer 32 with a $T_{c1}$ interrupt signal at which time, the microcomputer reloads the fourth register of counter 50 with the word $w_{Tc1}$. The length or duration of word $w_{Tc1}$ is selected such that counter 50 generates a $T_{c1}$ interrupt signal every $512\mu$ seconds.

The pulse width modulation signal pulses $f_1$, $f_2$ and $f_3$ and the half cycle polarity signal pulses $\phi_1$, $\phi_2$ and $\phi_3$ generated by the microcomputer after receipt of each $T_c$ interrupt signal from timing circuit 38 are supplied sequentially via data bus 34 to an output port 52, typically comprised of a model 8255 port such as manufactured by Intel Corp. After all of pulse width modulation signal pulses $f_1$, $f_2$ and $f_3$ and half cycle polarity signal pulses $\phi_1$, $\phi_2$ and $\phi_3$ are received by output port 54, the pulse width modulation signal pulses and the half cycle polarity signal pulses are transmitted to a flip-flop 54, typically comprised of a model 74LS109 flip-flop such as manufactured by Texas Instruments, where each pulse width modulation signal pulse and each half cycle polarity signal pulse is stored in separate buffer location.

Flip-flop 54 is also supplied from counter 50 with clock signals $C_1$, $C_2$ and $C_3$ and upon their receipt, flip-flop 54 supplies inverter 14 shown in FIG. 1a with the pulse width modulation signal pulses and the half cycle polarity signal pulses stored in the flip-flop during previous interrupt interval. By loading flip-flop 54 with pulse width modulation signal pulses and half cycle polarity signal produced by microcomputer 32 in advance of the time such pulses are transmitted from the flip-flop to inverter 14, no time is wasted by inverter 14 waiting for pulse width modulation signal pulses and half cycle polarity signal pulses to be produced, and thus smooth operation of machine drive system 10 shown in FIG. 1a is assured.

Figure 2:
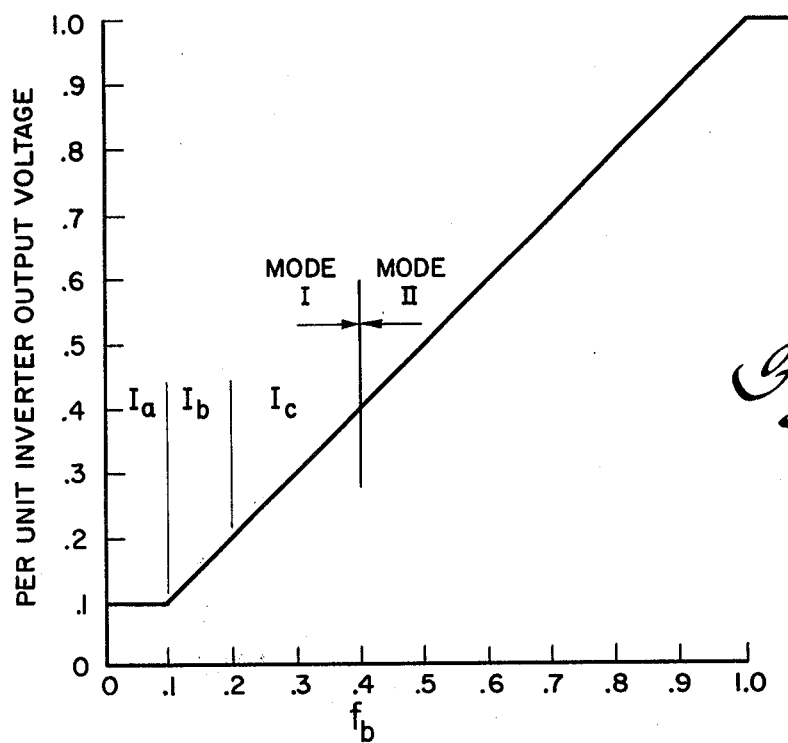
FIG. 2 is a graphical illustration of per unit inverter output voltage versus per unit inverter frequency indicating the frequency range of each mode of operation of the control apparatus of FIG. 1b.

Operation of control apparatus 30 is divided into two modes, mode I and mode II with mode I being subdivided into three submodes, IA, IB, and IC, respectively. Referring now to FIG. 2, Mode I operation is commenced during intervals when inverter frequency is equal to or less than 0.4 per unit while Mode II operation is commenced during intervals when inverter per unit frequency is greater than 0.4. During mode I control apparatus operation, pulse width modulation signal pulses $f_1$, $f_2$ and $f_3$ are generated by microcomputer 32 shown in FIG. 1b in accordance with the equilateral triangulation method which is characterized by the steps of:

(1) sampling a per unit amplitude sinusoidal reference waveform at successive intervals;
(2) scaling the sampled data by the magnitude of the operator commanded voltage $V_s$; and (3) converting the scaled sampled data into a pulse of unity amplitude and of duration proportional to the scaled sampled data.

Figure 3A:
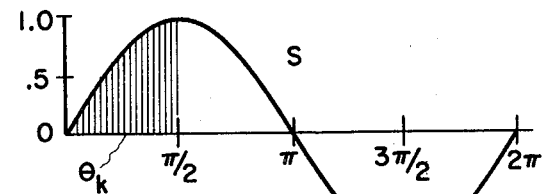
FIG. 3a is a graphical illustration of a per unit sinusoidal waveform.
Figure 3B:
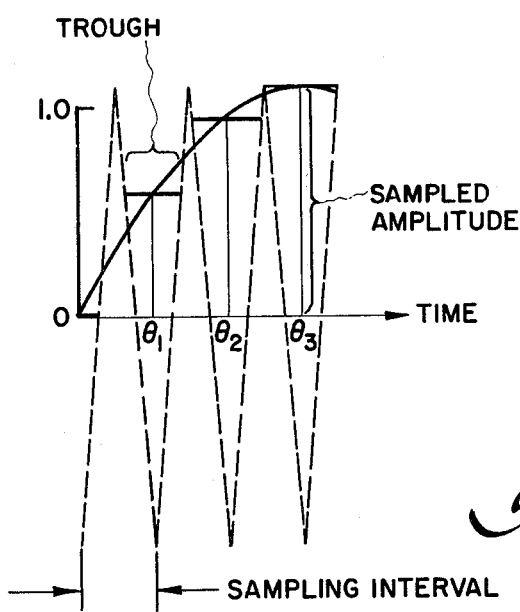
FIG. 3b is a graphical illustration of the per unit sinusoidal waveform of FIG. 3a indicating the waveform amplitude at each of a plurality of sampling intervals.
Figure 3C:
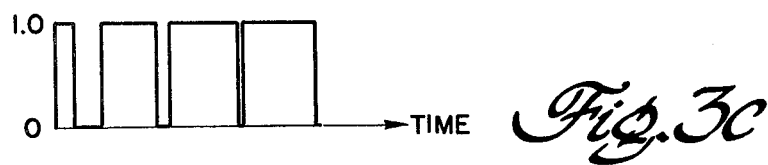
FIG. 3c is a graphical illustration of the pulse train produced by sampling of the sinusoidal waveform as indicated in FIG. 3b.

A better understanding of Mode I control apparatus operation may be gained by reference to FIGS. 3a, 3b and 3c. Prior to Mode I operation, a per unit amplitude sinusoidal waveform (representing the fundamental component of each phase of the desired inverter output voltage), such as the one illustrated in FIG. 3a, is stored in the memory of microcomputer 32 shown in FIG. 1b in the form of a look-up table which contains K values, each corresponding to the instantaneous magnitude of the sinusoidal waveform at a successive one of k angular intervals, each designated $\theta_k$, where k runs from 1 to K. In practice, K is typically 192. During mode I operation, the instantaneous magnitude of the sinusoidal reference waveform is sampled periodically, either every $T_{c1}$ seconds or every $T_c$ seconds depending on whether the microcomputer is operating in submode IA or one of submodes IB or IC, respectively. The rationale for sampling at one rate during submode IA and at another rate during each of submodes Ib and IC will be better understood hereinafter. Sampling of the sinusoidal waveform is illustrated graphically in FIG. 3b. In actuality, sampling is accomplished by referring to the sinusoidal waveform look-up table in memory and reading the stored magnitude or value at each of the three angular intervals $\theta_k$, $\theta_k+120°$ and $\theta_k+240°$.

Once the three magnitude values of the reference sine waves are obtained by the microcomputer, microcomputer 32 scales each magnitude value by the magnitude of $V_s$, the operator-commanded voltage. Microcomputer 32 then generates pulse width modulation signal pulses $f_1$, $f_2$ and $f_3$, each pulse being of unity amplitude and of a duration or length proportional to a separate one of the three scaled sinusoidal magnitude values, respectively. By continuing the process of sampling the sinusoidal waveform magnitude at each of the three angular values $\theta_k$, $\theta_k+120°$ and $\theta_k+240°$, with the value of k being incremented after each sampling, scaling the sampled magnitude values by $V_s$, and converting each of the scaled magnitude values into a pulse of a duration proportional to the scaled magnitude value, each of three pulse strings can be produced, each having a waveform identical to the one illustrated in FIG. 3c. Since each of the three sampled sinusoidal waveform amplitudes is separated in phase by 120° from the other two, it follows that each of the three pulse trains will be shifted in phase from the other two by 120° in time.

In addition to containing the sinusoidal reference waveform magnitude look-up table, microcomputer 32 memory also is provided with three half cycle polarity data look-up tables, the tables typically being entered into memory during fabrication of control apparatus 30. Each half cycle polarity data look-up table contains entries which each represent the polarity of a successive segment of a separate one of the three phase components of desired inverter output voltage, respectively. To generate each of half cycle polarity signal pulses $\phi_1$, $\phi_2$ and $\phi_3$, the microcomputer references the entry in a respective one of the three phase command signal data look-up tables identified by the table pointer and then generates a pulse whose polarity varies in accordance with the polarity of the identified table entry.

Each time flip-flop 54 supplies inverter 14 shown in FIG. 1a with pulse width modulation signal pulses $f_1$, $f_2$ and $f_3$ and half cycle polarity signal pulses $\phi_1$, $\phi_2$ and $\phi_3$, the inverter alternately renders the switching devices of each pair conductive, with the sequence of switching device of conduction of each pair varying in accordance with a separate one of signal pulses $\phi_1$, $\phi_2$ and $\phi_3$, and the conduction duration of each switching device varying in accordance with the length or duration of a separate one of pulse width modulation signal pulses $f_1$, $f_2$ and $f_3$. The entries in each of the three half cycle polarity look-up tables are arranged such that the polarity of half cycle polarity signal pulses $\phi_1$, $\phi_2$ and $\phi_3$ change in sequence. This assures that the pairs of inverter switching devices switch in sequence. Controlling the sequence and conduction duration of inverter switching devices in accordance with the pulse width modulation signal pulses and half cycle polarity signal pulses generated by microcomputer 32 in the manner described above, causes inverter to generate a three phase alternating voltage at its output.

The three phase alternating voltage which results from control of inverter switching device conduction in accordance with the equilateral triangulation method described above, exhibits a fundamental waveform that closely simulates the waveform that results from control of inverter switching device conduction by the conventional triangulation method described by Zubek, Abbandonti and Norby in their paper "Pulse Width Modulated Inverter Motor Drives With Improved Modulation", published in the IEEE Transactions on Industry Applications, Vol. IA11, No. 6, November/December 1975. This similarity of waveforms may be confirmed by reference to FIG. 3b which illustrates the intersection of a fictitious triangle waveform (shown by dashed lines) with a per unit sinusoidal waveform. As may be observed from that Figure, each of the troughs of the triangular waveform that intersect the sinusoidal waveform is proportional in length to each successive sampled of the sinusoidal waveform.

Figure 4:
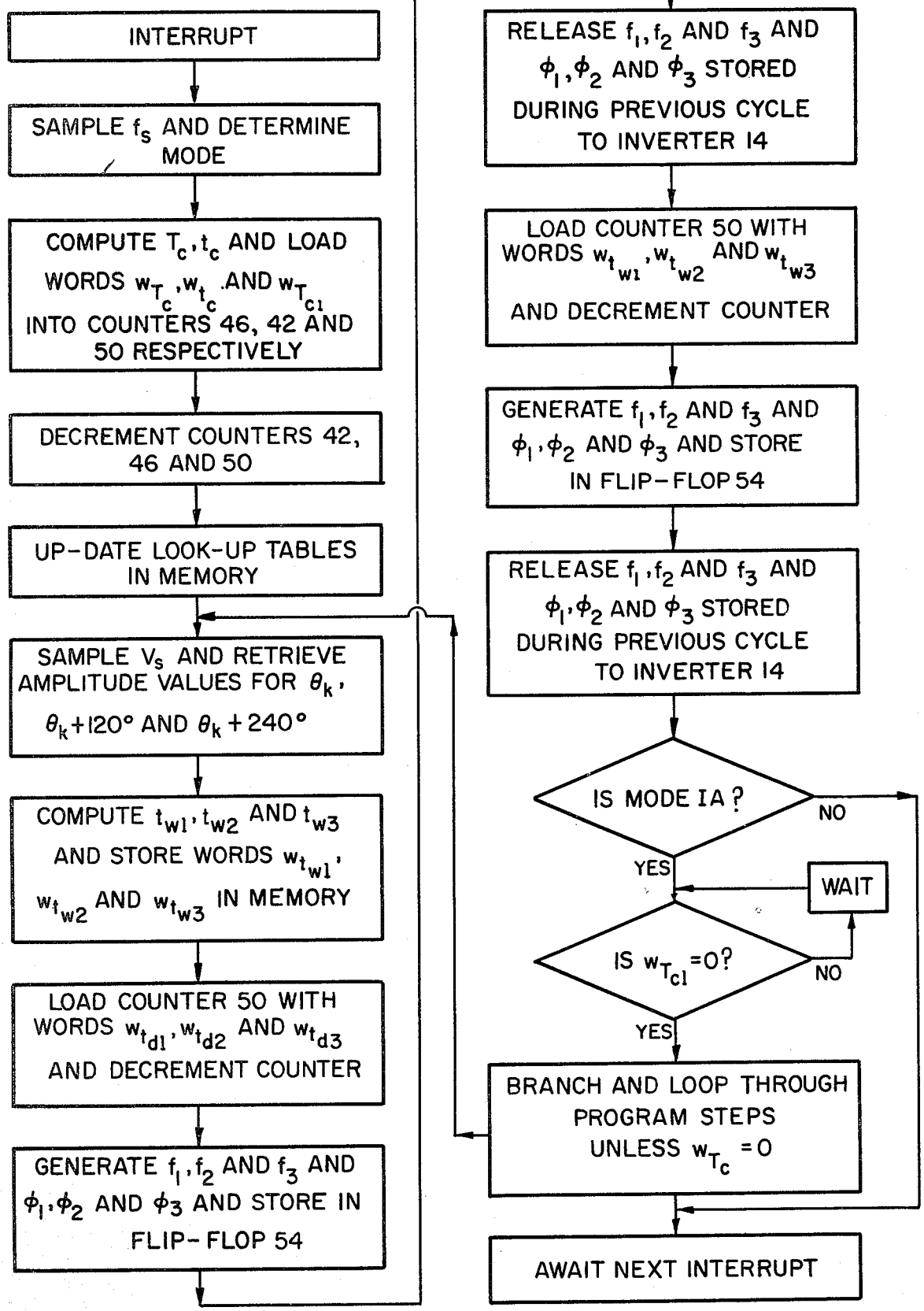
FIG. 4 is a flow chart diagram of the first of the pair of stored programs executed by the control apparatus of FIG. 1b.

Mode I operation is commenced by control apparatus 30 shown in FIG. 1b upon execution by microcomputer 32 of the first of a pair of stored programs illustrated in flow chart form in FIG. 4. Initially, the microcomputer is supplied from timing circuit 38 shown in FIG. 1b with a $T_c$ interrupt signal. Thereafter, microcomputer 32 samples $f_s$, that is to say, the microcomputer interrogates port 36 and, in accordance with $\omega_s$, the microcomputer determines the operator commanded frequency magnitude $f_s$ and then ascertains in which of submodes Ia, IB or IC to operate.

Next, the computer computes $|T_C|$, the carrier period, that is to say, the duration of the interval between successive occurrences of a $T_c$ interrupt signal, in accordance with the relationship:

$$|T_c| = 1/(n \cdot f_s) \quad (1)$$

where n, the sampling interval multiplier, is given by table I.

TABLE I

| Submode | n | Frequency Range |
|---------|-----|------------------|
| IA | 192 | 0.0–0.1 per unit |
| IB | 96 | 0.1–0.2 per unit |
| IC | 48 | 0.2–0.4 per unit |

Once the carrier period $|T_c|$ is computed, the timing period $|t_c|$, that is, the duration of the interval between successive occurrences of a $t_c$ interrupt signal, is computed therefrom in accordance with the expression:

$$|t_c| = |T_c|/n \qquad (2)$$

Note that the carrier period $T_c$ and the timing period $t_c$ change in magnitude in accordance with the particular submode of operation. As will become better understood hereinafter, adjusting the carrier period in accordance with the particular submode of operation assures uniform control apparatus operation.

After $|T_c|$ and $|t_c|$ have been computed, words $w_{T_c}$ and $w_{t_c}$, each proportional in length to one of periods $T_c$ and $t_c$, respectively, are loaded into counters 46 and 42, respectively. Also, the word $w_{T_{c1}}$, proportional in length to the fixed time period $T_{c1}$, is loaded into the fourth register of counter 50. Counters 42, 46 and 50 are then decremented. Decrementation of counters 42, 46 and 50 is continuous, that is to say, when the register contents of each counter is zero, then each of counters 42, 46 and 50 is automatically reloaded with one of words $w_{tc}$, $w_{T_c}$ and $w_{T_{c1}}$, respectively. Since $|t_c|$ and $|T_{c1}|$ are always smaller in magnitude than $|T_c|$, counters 42 and 50 are reloaded more than once during each execution of the program in contrast to counter 46 which is only loaded once during program execution.

Following initiation of counter decrementation, each of the look-up tables stored in the microcomputer is up-dated, that is to say, that the table pointer identifying a particular table entry is advanced to identify the next subsequent entry. This assures that the appropriate value will be read from each table. After the look-up tables are up-dated, the microcomputer samples the magnitude of $V_s$ and then retrieves three values corresponding to the instantaneous magnitudes of the unity amplitude sinusoidal reference waveform at the respective angular intervals $\theta_k$, $\theta_k + 120°$ and $\theta_k + 240°$.

Next, microcomputer 32 computes pulse widths or duration $t_{w1}$, $t_{w2}$ and $t_{w3}$ of pulse width modulation signal pulses $f_1$, $f_2$ and $f_3$, respectively. Pulse widths $t_{w1}$, $t_{w2}$ and $t_{w3}$ are given by the respective relationships:

$$t_{w1} = [0.5n \sin(\theta_k) V_S/V_{sm} + 0.5n]t_c \qquad (4)$$

$$t_{w2} = [0.5n \sin(\theta_k + 120°) V_S/V_{sm} + 0.5n]t_c \qquad (5)$$

$$t_{w3} = [0.5n \sin(\theta_k + 240°) V_S/V_{sm} + 0.5n]t_c \qquad (6)$$

where $V_{sm}$ is the maximum allowable value of $V_S$. Once pulse width $t_{w1}$, $t_{w2}$ and $t_{w3}$ are computed, words $w_{tw1}$, $w_{tw2}$ and $w_{tw3}$, respectively, each representative of a separate one of pulse widths $t_{w1}$, $t_{w2}$ and $t_{w3}$, respectively, are then stored in the microcomputer memory.

To insure that each of pulse width modulation signal pulses $f_1$, $f_2$ and $f_3$ is spaced symmetrically within the sampling interval or carrier period of duration $|T_c|$, microcomputer 32 then computes pulse delay durations $t_{d1}$, $t_{d2}$ and $t_{d3}$, each pulse delay duration being equal in magnitude to the duration of the interval between receipt of a $T_c$ interrupt signal and subsequent generation of a separate one of signal pulses $f_1$, $f_2$ and $f_3$, respectively. Pulse delay durations $t_{d1}$, $t_{d2}$ and $t_{d3}$ are each given by a separate one of the relationships:

$$t_{d1} = 0.5(T_c - t_{w1}) \qquad (7)$$

$$t_{d2} = 0.5(T_c - t_{w2}) \qquad (8)$$

$$t_{d3} = 0.5(T_c - t_{w3}) \qquad (9)$$

Once pulse delay durations $t_{d1}$, $t_{d2}$ and $t_{d3}$ are computed words $w_{td1}$, $w_{td2}$ and $w_{td3}$, each proportional in length to one of pulse delay durations $t_{d1}$, $t_{d2}$ and $t_{d3}$, respectively, are then stored in the microcomputer memory.

After words $w_{tw1}$, $w_{tw2}$ and $w_{tw3}$ and words $w_{td1}$, $w_{td2}$ and $w_{td3}$ are stored in memory, pulse delay duration words $w_{td1}$, $w_{td2}$ and $w_{td3}$ generated during the previous execution of the program are each loaded into a separate one of the first three registers in counter 50. Decrementation of each of the three counter registers is commenced every $|t_c|$ seconds. When each of the three counter registers is empty, counter 50 supplies a separate one of clock signals $C_1$, $C_2$ and $C_3$, respectively, to the microcomputer and to flip-flop 54. In response to clock signals $C_1$, $C_2$ and $C_3$, microcomputer 32 generates pulse width modulation signal pulses $f_1$, $f_2$ and $f_3$, respectively, each of a null amplitude and each of a duration proportional to the duration of the interval between receipt of the interrupt signal $T_c$ and receipt of a separate one of clock signals $C_1$, $C_2$ and $C_3$, respectively. After generation of pulse width modulation signal pulses $f_1$, $f_2$ and $f_3$, the three pulse width modulation signal pulse, together with half cycle polarity signal pulse $\phi_1$, $\phi_2$ and $\phi_3$, each generated in accordance with the identified entry from one of three half cycle polarity look-up tables, respectively, are then stored in flip-flop 54. Flip-flop 54 is also responsive to clock signals $C_1$, $C_2$ and $C_3$ and upon receipt of clock signals $C_1$, $C_2$ and $C_3$ from counter 50, flip-flop 54 transmits pulse width modulation signal pulses $f_1$, $f_2$ and $f_3$, respectively, and half cycle polarity signal pulses $\phi_1$, $\phi_2$ and $\phi_3$ that were generated and stored in the flip-flop during the previous execution of the program to inverter 14.

Once microcomputer 32 supplies pulse width modulation signal pulses $f_1$, $f_2$ and $f_3$ and half cycle polarity signal pulse $\phi_1$, $\phi_2$ and $\phi_3$ to flip-flop 54, the microcomputer then loads counter 50 with words $w_{tw1}$, $w_{tw2}$ and $w_{tw3}$, each generated during the previous interrupt interval, with each word being loaded to a separate one of three registers within counter 50. Each of three counter registers is decremented every $|t_c|$ seconds and when the counter registers each become empty, then counter 50 again supplies both microcomputer 32 and flip-flop 54 with clock signals $C_1$, $C_2$ and $C_3$. Upon subsequent receipt of clock signals $C_1$, $C_2$ and $C_3$, microcomputer 32 then generates each of pulse width modulation signal pulses $f_1$, $f_2$ and $f_3$, respectively, each pulse width modulation signal pulse now being of unity amplitude and of a duration proportional to each of pulse durations $t_{w1}$, $t_{w2}$ and $t_{w3}$, respectively. Once each of pulse width modulation signal pulses $f_1$, $f_2$ and $f_3$ is generated, they are transmitted together with the already generated set of half cycle polarity signal pulses $\phi_1$, $\phi_2$ and $\phi_3$ to flip-flop 54 for storage. As before, flip-flop 54 is also supplied to clock signals $C_1$, $C_2$ and $C_3$, and upon their receipt, flip-flop 54 supplies inverter 14 with pulse width modulation signal pulses $f_1$, $f_2$ and $f_3$ and half cycle polarity signal pulses $\phi_1$, $\phi_2$ and $\phi_3$ stored in the flip-flop during the previous interrupt intervals.

When the flip-flop has completed transission of pulse width modulation signal pulses $f_1$, $f_2$ and $f_3$ and half cycle polarity signal pulses $\phi_1$, $\phi_2$ and $\phi_3$ to inverter 14, microcomputer 32 then determines whether or not the desired submode of operation is IA. Should the desired submode of operation be IA, then microcomputer 32 determines whether the contents of the fourth register of counter 50 (word $w_{T_{c1}}$) is zero. If the contents of the fourth register of counter 50 are not zero, then microcomputer 32 waits until the contents become zero which occurs eventually since the fourth register of counter 50 is being decremented continuously. After the contents of counter 50's fourth register become zero, a branch in the program occurs, and each of the program steps commencing with sampling of $V_s$ and retrieving of each of the sinusoidal waveform amplitude values at each of the angular intervals $\phi_k$, $\phi_k + 120°$ and $\phi_k + 240°$, respectively, are re-executed in sequence repeatedly until the register contents of counter 46 (word $w_{Tc}$) are zero at which time, execution of the program ends until subsequent generation of another $T_c$ interrupt signal by timing circuit 38. During each of submodes IB and IC, execution of the program ends after transmission of the stored frequency command signals and phase command signals from flip-flop 54 to inverter 14.

During submode IA control apparatus operation, sampling of the sinusoidal waveform amplitude, scaling of the sampled amplitude, and generation of pulse width modulation and half cycle polarity signal pulses occurs every $T_{c1}$ seconds as opposed to operation during submodes IB and IC where these steps are performed every $T_c$ seconds a period much longer than $T_{c1}$. The rationale for completing these steps every $T_{c1}$ seconds only during submode IA operation is that during submode IA operation machine frequency is very low and poor machine drive system performance results if sampling, scaling, and pulse generation were to occur every $T_c$ seconds. When machine frequency is increased by increasing $f_s$, then $T_c$ becomes much smaller and thus sampling, scaling, and pulse generation every $T_c$ seconds affords good machine drive system performance. Submode IA operation is characterized as asynchronous since the sampling period is fixed rather than proportional to $f_s$. Conversely, since the sampling period during each of submodes IB and IC is proportional to $f_s$, each of the modes is characterized as synchronous.

Figure 5:
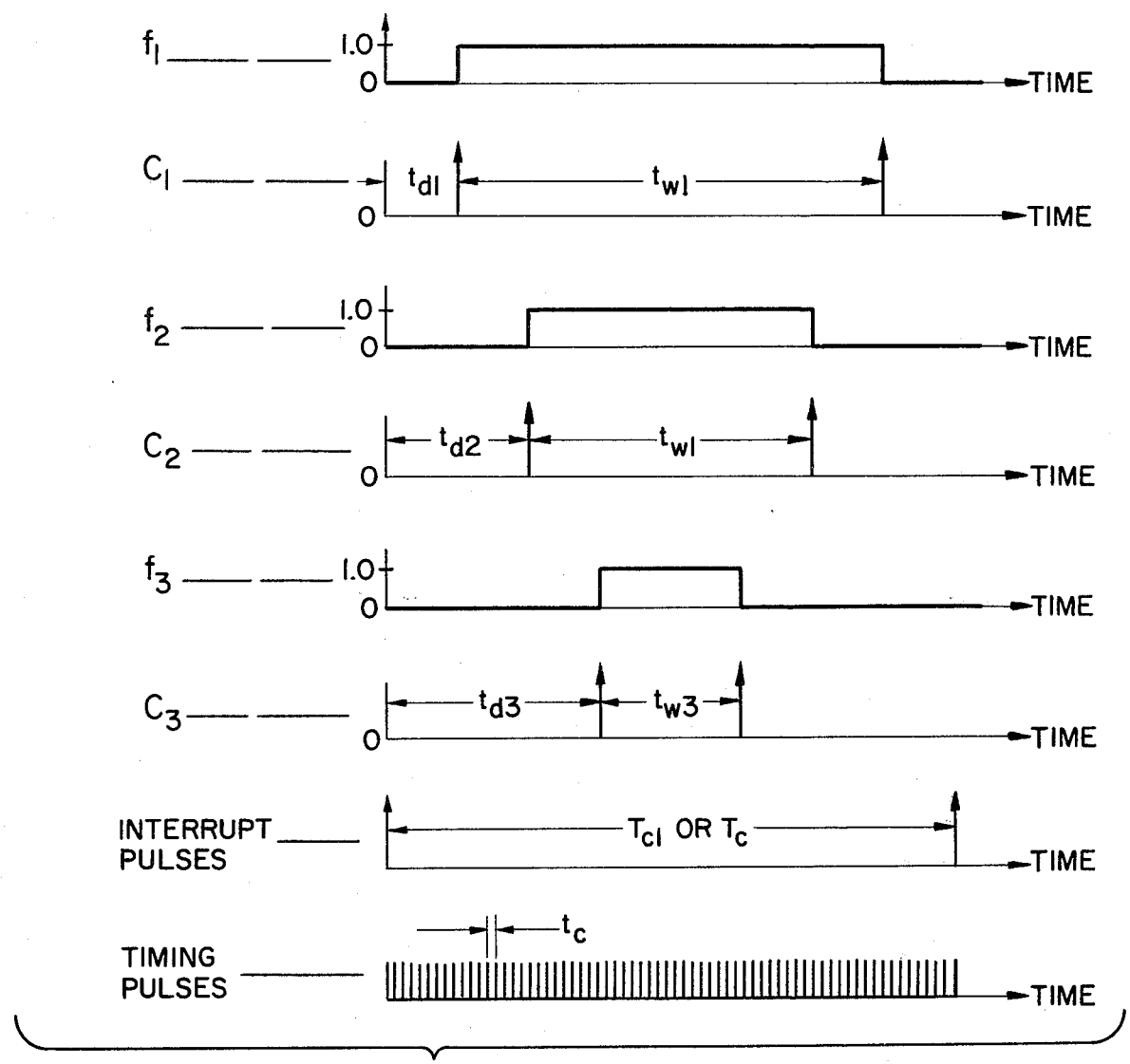
FIG. 5 is a graphical relationship of the pulses and timing signals produced during execution of the program illustrated in FIG. 4.

To better understand the relationship between clock signals $C_1$, $C_2$ and $C_3$ and pulse width modulation signal pulses $f_1$, $f_2$ and $f_3$, respectively, reference should be had to the timing chart of FIG. 5. As illustrated, during each interrupt interval of duration $T_c$ seconds, clock signals $C_1$, $C_2$ and $C_3$ are first generated by counter 50 after a period of $t_{d1}$, $t_{d2}$ and $t_{d3}$ seconds, respectively, commencing from the start of the interrupt interval. Each of pulse width modulation signal pulses $f_1$, $f_2$ and $f_3$ is of null amplitude prior to the first occurrence of a separate one of clock signals $C_1$, $C_2$ and $C_3$, respectively. After the occurrence of a separate one of clock signals $C_1$, $C_2$ and $C_3$ each of pulse width modulation signal pulses $f_1$, $f_2$ and $f_3$ changes from null amplitude to unity amplitude and remains at unity amplitude until generation of a subsequent one of clock signals $C_1$, $C_2$ and $C_3$, respectively. Also illustrated in FIG. 5 is the relationship between the $T_c$ interrupt pulses generated every $|T_c|$ seconds and the $t_c$ timing signals generated every $|t_c|$ seconds. As seen from FIG. 5, n timing signals occur during each interrupt interval where n changes with machine frequency as indicated in Table I.

Figure 6:
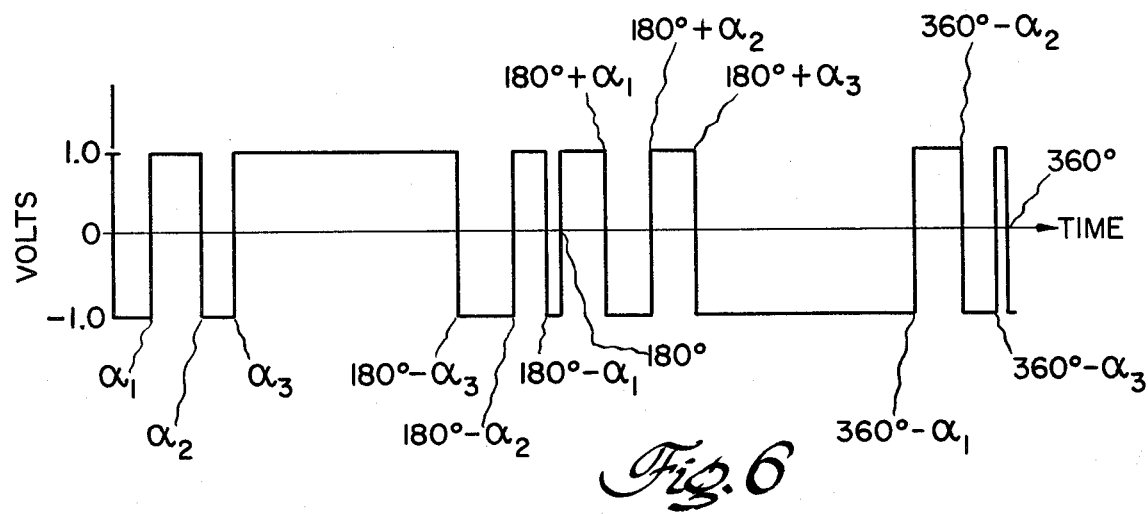
FIG. 6 is a graphical illustration of one of the three phase components of inverter output voltage during intervals of inverter frequency greater than 0.4 per unit but less than 1.0 per unit.

Once per unit inverter frequency exceeds 0.4, control apparatus commences mode II operation. Unlike control apparatus mode I operation which is characterized by generation of pulse width modulation signal pulses by the equilateral triangulation method, mode II operation is characterized by synthesis of inverter pulse width modulation pulses from a set of 720 discrete word strings which are stored in the microcomputer memory, each discrete word string repesenting the quarter waveform segment of a separate one of the three phase component waveforms of desired inverter output voltage. A better understanding of mode II control apparatus operation may be facilitated by reference to FIG. 6. It can be seen that the waveform illustrated in FIG. 6 can be readily synthesized from a square wave by symmetrically placing notches of an appropriate width therein, with the location and duration of the notches being determined by one of chopping angles $\alpha_1$, $\alpha_2$ and $\alpha_3$. By controlling the magnitude of chopping angles $\alpha_1$, $\alpha_2$ and $\alpha_3$, the inverter output voltage waveform, and hence inverter output voltage, can be controlled accordingly.

Figure 7A:
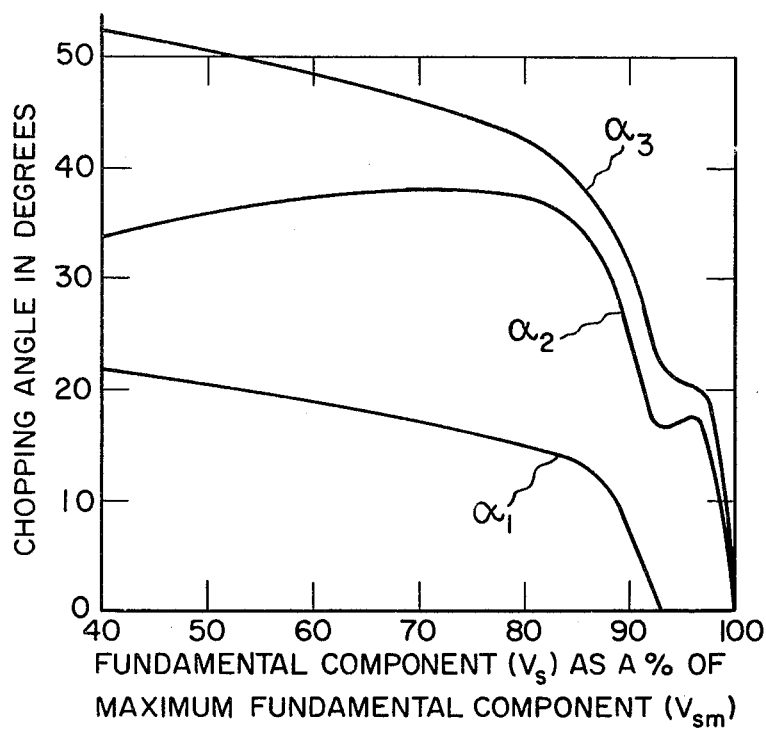
FIG. 7a illustrates the relationship between chopping angles $\alpha_1$, $\alpha_2$ and $\alpha_3$ and the fundamental component of inverter output voltage as a percentage of the maximum fundamental of inverter output voltage obtained by implementation of the selected harmonic elimination method.

At present, there are two well known techniques for selecting the magnitude of chopping angles $\alpha_1$, $\alpha_2$ and $\alpha_3$ to obtain each of the three phase component waveforms of desired inverter output voltage. The first is designated as the selected harmonic elimination method. For an AC machine of known characteristics, chopping angles $\alpha_1$, $\alpha_2$ and $\alpha_3$, that is, the inverter commutation angle for each of the three respective pairs of inverter switching devices, can be selected in accordance with the ratio of $V_s/V_{sm}$ as illustrated in FIG. 7a such that at any given value of machine voltage, 5th and 7th inverter voltage harmonics are eliminated, thereby reducing undesirable circulating currents, and hence, machine losses. For a further, more detailed understanding of a selected harmonic elimination technique, reference should be had to the papers "Generalized Techniques of Harmonic Elimination and Voltage Control in Thyristor Inverters", Part I and Part II by Patel and Hoft, published in the IEEE Transactions on Industry Applications, Volume IA-9, No. 3, May-June 1973 and Volume IA-10, No. 5, September-October 1974.

Figure 7B:
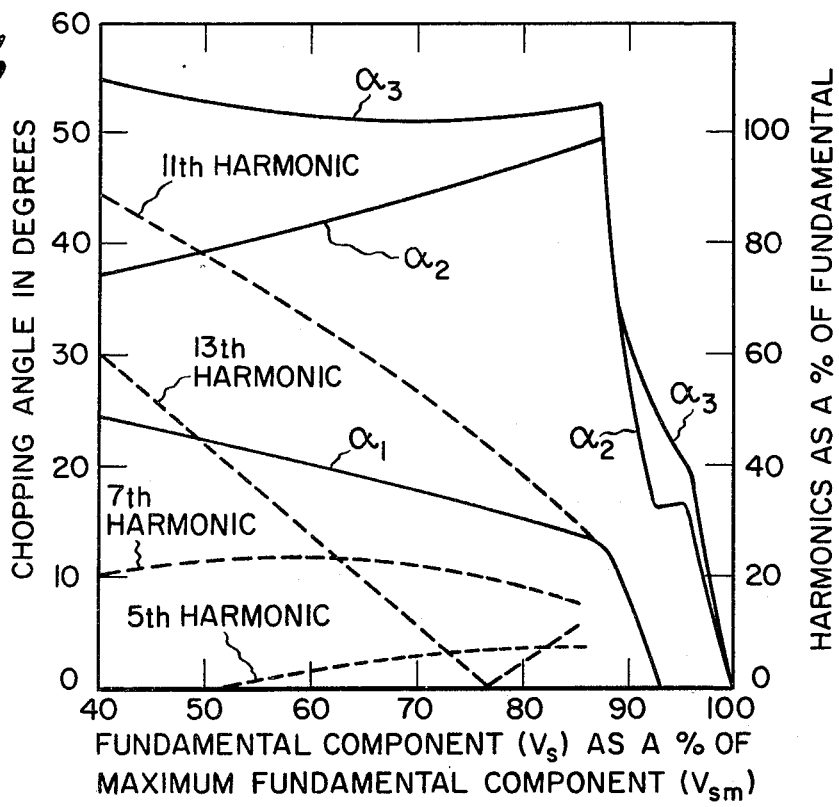
FIG. 7b illustrates the relationship between chopping angles $\alpha_1$, $\alpha_2$ and $\alpha_3$ and the fundamental component of inverter output voltage as a percentage of the maximum fundamental component of inverter output voltage obtained by implementation of the rms machine ripple current minimization method.

The second of the two methods of selecting chopping angles $\alpha_1$, $\alpha_2$ and $\alpha_3$ is rms machine ripple current minimization technique. According to the rms machine ripple current minimization technique, chopping angles $\alpha_1$, $\alpha_2$ and $\alpha_3$ are selected in accordance with the ratio or $V_s/V_{sm}$ such that resultant rms machine ripple currents are minimized as the name of this technique implies. Selecting the magnitude of each of chopping angles $\alpha_1$, $\alpha_2$ and $\alpha_3$ to minimize rms ripple machine currents yields the relationship between chopping angle and per unit voltage which is illustrated graphically in FIG. 7b. The relationship between fifth, seventh, eleventh and thirteenth harmonics versus the fundamental voltage harmonic as a percentage of the maximum fundamental voltage is also illustrated in FIG. 7b. It should be noted that some fifth and seventh harmonics are present when the rms machine ripple current technique is employed. However, use of the minimum rms ripple current technique in contrast to the selected harmonic elimination technique described above results in better overall machine drive system performance because a larger value of the first harmonic of inverter voltage can be supplied to the machine than is possible using a selected harmonic elimination technique. For a further, more detailed discussion of the rms machine ripple current minimization technique, reference should be had to the paper "Optimal Pulse Width Modulation For Feeding AC Motors" by Buja and Indri, published in the IEEE Transactions on Industry applications, Volume IA-13, No. 1, January/February 1977.

In practice, the 720 discrete word strings stored in the memory of microcomputer 32 are divided into three sets of 240 word strings each. Each of the 240 word strings of each set represent the waveform of a respective one of the three phase components of inverter output voltage corresponding to a successive one of the 240 quarter percent increments of per unit inverter output voltage between 0.4 and 1.0 per unit. Each word string comprises six words, $w_1$, $w_2$, $w_3$, $w_4$, $w_5$ and $w_6$, respectively, with each word representing a successive portion of the first 90° or quarter waveform segment of the particular inverter output voltage phase component waveform. Words $w_1$-$w_6$ of each word string are each comprised of 8 bits, the most significant bit representing the polarity of the waveform portion represented by each word, and the remaining 7 bits being indicative of the length or duration of the waveform segment portion.

Figure 8:
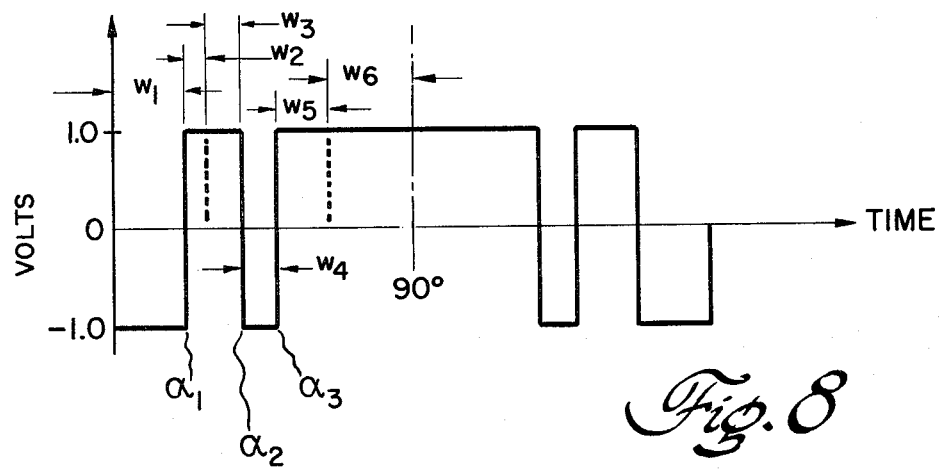
FIG. 8 is a graphical illustration of the relationship between the words $w_1$, $w_2$, $w_3$, $w_4$, $w_5$ and $w_6$ of one of the stored word strings and the first quarter waveform of the corresponding one of the three respective inverter input voltage phase components represented by the stored word string.

The relationship between words $w_1$-$w_6$ of a particular word string, and the quarter waveform segment of the corresponding inverter output voltage phase component represented thereby is illustrated in FIG. 8. As can be observed, the length of each of words $w_1$-$w_6$ controls the magnitude of chopping angles $\alpha_1$, $\alpha_2$ and $\alpha_3$. Typically, the words of each word string are selected of predetermined length such that chopping angles $\alpha_1$, $\alpha_2$ and $\alpha_3$ vary directly with the ratio $V_s/V_{sm}$ in accordance with either the selected harmonic technique described with respect to FIG. 7a or the rms machine ripple current minimization technique described with respect to FIG. 7b. It is important to note that since each phase component waveform of inverter output voltage is symmetrical about the zero axis, and that each half waveform segment is symmetrical about $\pi/2$, each word string need only represent the first quarter waveform segment of each inverter output voltage phase component since the remaining 270° portion of the phase component waveform can be reproduced therefrom.

Figure 9:
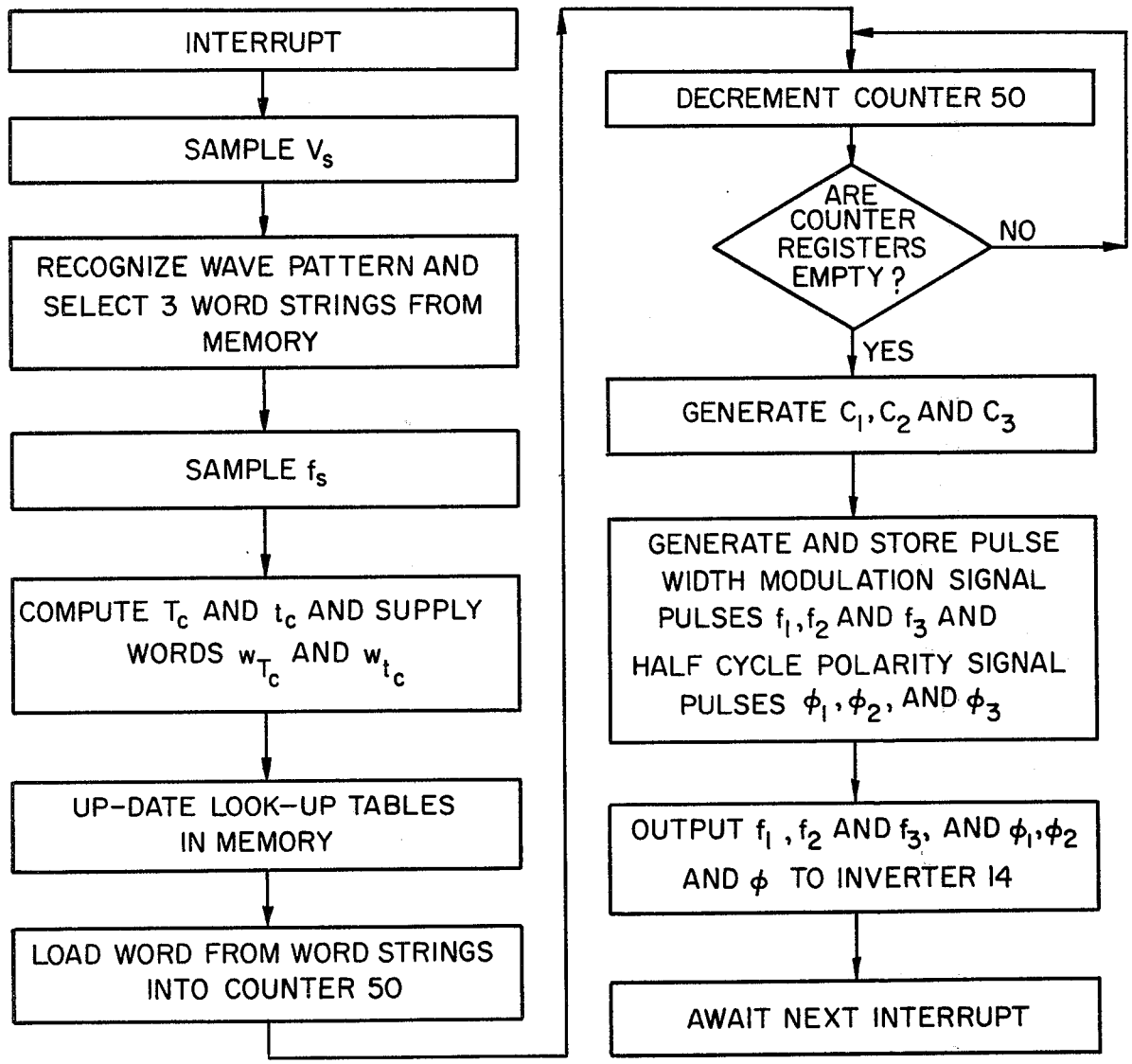
FIG. 9 is a flow chart representation of the second of the stored programs contained within the control apparatus shown in FIG. 1b.

During mode II operation, microcomputer 32 illustrated in FIG. 1b executes the second of a pair of stored programs illustrated in flow chart form in FIG. 9 to supply inverter 14 with frequency command signals synthesized from the discrete stored word strings. Initially, after receipt of an interrupt signal, microcomputer 32 samples output port 36 to obtain the magnitude of $V_s$ the operator commanded voltage. Once the $V_s$ has been sampled, the microcomputer "recognizes" the wave pattern. This is to say, that in accordance with the sampled value of $V_s$, microcomputer 32 retrieves three word strings from memory, such as $W_a$, $W_b$ and $W_c$, each word string representing the waveform of a respective one of the three phase components of desired inverter output voltage. After the waveform patterns are retrieved from memory, microcomputer 32 samples input port 36 to determine the magnitude of $f_s$, the operator commanded frequency. Once the magnitude of $f_s$ is determined, the carrier period $|T_c|$ is computed from equation (1) where n=6. Once $|T_c|$ is computed, then $|t_c|$ is computed in accordance with equation (2). Upon completion of computation of $|T_c|$ and $|t_c|$, words $w_{T_c}$ and $w_{t_c}$, each proportional in length to the magnitude of one of time periods $|T_c|$ and $|t_c|$, respectively, are transmitted from microcomputer 32 via data bus 34 to counter port 48 for subsequent loading into a respective one of counters 42 and 46, all illustrated in FIG. 1b.

Next, each of the three look-up tables in the microcomputer memory containing half cycle polarity data is up-dated. After each of the three tables is updated, the first word, $w_1$, of each of the word strings $W_a$, $W_b$ and $W_c$ retrieved previously from the microcomputer memory is loaded into a separate one of the first three registers, respectively, of counter 50. Each register is then decremented every $|t_c|$ seconds until the register contents are zero at which time counter 50 supplies the microcomputer with one of clock signals $C_1$, $C_2$ and $C_3$, respectively. In response to clock signals $C_1$, $C_2$ and $C_3$, microcomputer 32 generates pulse width modulation signal pulses $f_1$, $f_2$ and $f_3$, each pulse width modulation signal pulse being proportional in duration to the interval elapsing between generation of a $T_c$ interrupt signal and receipt by the microcomputer of a separate one of clock signals $C_1$, $C_2$ and $C_3$, respectively. Once generated, pulse width modulation pulses $f_1$, $f_2$ and $f_3$ are transmitted from microcomputer 32 via data bus 34 to output port 52 for loading within a separate one of three locations, respectively, in flip-flop 54. After the counter registers are each empty, the next successive word of each word string is loaded into a separate one of the three respective counter registers and the counter registers are each decremented as before until empty. Eventually, each of the words $w_1$-$w_6$ of each word string and loaded into the counter and decremented and a corresponding pulse width modultion signal pulse, proportional in duration to the length of a separate one of words $w_1$-$w_6$ is stored in flip-flop 54.

During the time microcomputer 32 supplies pulse width modulation signal pulses $f_1$, $f_2$ and $f_3$ to the flip-flop 54, the microcomputer also supplies half cycle polarity signal pulses $\phi_1$, $\phi_2$ and $\phi_3$ to flip-flop 54 for storage as follows. When the identified entry in one of the half cycle polarity data look-up tables indicates that the polarity of a corresponding one of the three respective inverter output voltage phase component waveform segments should be positive during the carrier period $T_c$, then the polarity of corresponding half cycle polarity signal pulse transmitted by the microcomputer will be determined directly from the polarity bit of the then-decremented word of a corresponding one of the three word strings, respectively, retrieved at the outset of the sampling period. If, however, the entry in the half cycle polarity data look-up table indicates that the corresponding inverter output voltage phase component waveform segment should be of negative polarity, then the half cycle polarity signal pulse supplied by the microcomputer to flip-flop 54 will have a polarity opposite to the polarity bit of each decremented word.

Flip-flop 54 is also supplied with clock signals $C_1$, $C_2$ and $C_3$ and, upon receipt thereof from counter 50, flip-flop 54 supplies inverter 14 with the pulse width modulation signal pulses and half cycle polarity signal pulses stored in the flip-flop during the previous interrupt interval. Microcomputer 32 then awaits the next interrupt before re-executing the program. In this manner, the second of the pair of stored programs is repeatably executed to supply inverter 14 with pulse width modulated signal pulses and half cycle polarity signal pules to regulate inverter switching device conduction.

As execution of the second of the pair of stored programs continues, the notches in each of the three inverter output voltage phase components shift towards the edges of the waveform and the notches then decrease in width by one degree for each percentage increase in per unit inverter output voltage. Eventually, as the per unit inverter output voltage magnitude reaches 1.0 per unit, the notches disappear, that is to say, that each of chopping angles $\alpha_1$, $\alpha_2$ and $\alpha_3$ decreases to zero degrees, allowing the inverter to operate in the square wave mode.

The foregoing describes a microcomputer based control apparatus for an inverter fed machine drive system which supplies the inverter with pulse widtrh modulation signal pusles and half cycle polarity signal pulses to control the duration and conduction sequence of the inverter switching devices. By supplying the inverter with pulse width modulation signal pulses generated by the equilateral triangulation method during intervals of low machine frequency, and synthesized from discrete stored waveforms selected in accordance with either the selected harmonic elimination technique or the rms machine ripple current minimization technique during intervals of other than low machine frequency, the control apparatus assures smooth inverter-machine drive system operation.

While only certain preferred features of the invention have been shown by way of illusrration, many changes and modifications will occur to those skilled in the art. It is, therefore, to be understood that the appended claims are intended to cover all such modifications and changes as fall within the true spirit of the invention.

What is claimed is:

1. For use with a pulse width modulated inverter fed machine drive system comprised of a polyphase alternating current machine excited from a direct current voltage source through an inverter configured of a plurality of pairs of controlled switching devices, each of the controlled switching devices of each pair coupled in series aiding fashion and each of the pairs of controlled switching devices, respectively, coupled across the direct current source and coupled at the junction between switching devices of each pair to a separate one of the phases of the polyphase alternating current machine, an improved control apparatus for regulating the conduction frequency and conduction duration of inverter controlled switching devices to regulate machine speed and torque, comprising:

timing circuit means for generating a first interrupt signal at a frequency varying in accordance with an operator-command frequency and generating a second interrupt signal at a frequency proportional to the frequency of said first interrupt signal:

said timing circuit comprising, a clock for generating a clock signal at periodic intervals, a counter port for storing a first word proportional in length to the desired duration between successive occurrences of said first interrupt signal and storing a second word proportional in length to the desired duration between successive occurrences of said second interrupt signal; a first counter coupled to said counter port and to said clock, said first counter receiving said first word from said counter port and decrementing said first word from said counter port and decrementing said first word by a fixed amount upon receipt of a clock signal from said clock and when said first word is completely decremented, said first counter generating said first interrupt signal; a logic gate coupled to said clock for generating periodic pulses at a frequency twice the frequency of said clock signals; and a second counter coupled to said counter port and to said logic gate, said second counter receiving said second word from said counter port and decrementing said second word by a fixed amount upon each receipt of a signal from said logic gate, and when said second word is completely decremented, said second counter producing said second interrupt signal;

processor means coupled to said timing circuit means, said processor means being responsive to said timing circuit first and second interrupt signal and during intervals between successive occurrences of said timing circuit first interrupt signal, said processor means producing inverter pulse width modulation signal pulses and inverter half cycle polarity signal pulses to regulate the conduction duration and conduction sequence of inverter switching devices, respectively, said inverter pulse width modulation signal pulses being produced by said processor means by uniform sampling in accordance with said timing circuit means second interrupt signal when said operator-commanded frequency is below a preselected frequency and said inverter pulse width modulation signal pulse being produced by said processor means by synthesis from stored data in accordance with said timing circuit second interrupt signal when said operator-commanded frequency is above said preselected frequency; and storage means coupled to said processor means and to said inverter for retaining said pulse width modulation signal pulses and said half cycle polarity signal pulses generated by said processing means during each interval between successive occurrences of said timing circuit first interrupt signal and during each successive interval between successive occurrences of said timing circuit first interrupt signal, said storage means releasing pulse width modulation signal pulses and half cycle polarity signal pulses stored therein during each previous interval between successive occurrences of said timing circuit first interrupt signal to said inverter.

2. The invention according to claim 1 wherein said processor means comprises:

input port means for storing data representative of said operator-commanded frequency and representative of said operator-commanded inverter output voltage magnitude;

counter means coupled to said timing circuit, said counter means containing a plurality of discrete registers, the contents of which are decremented by a fixed amount each time said counter is supplied from said timing circuit means with said second interrupt signal, and said counter means producing a separate one of a plurality of clock signals each time a separate one of said plurality of counter registers becomes empty;

computer means coupled to said input port means and to said counter means, said computer means sampling said input port means and producing a first plurality of word strings during intervals when said operator-commanded frequency is less than said preselected frequency and producing a second plurality of word strings during intervals when said operator-commanded frequency is greater than said preselected frequency, each of the words of each of said first plurality of word strings being sequentially loaded into a separate one of said plurality of counter means registers during said intervals when said operator-commanded frequency is less than said preselected frequency and then decremented, and each of the words of each of said second plurality of word strings being sequentially loaded into a separate one of said plurality of counter means registers during intervals other than when said operator commanded frequency is less than preselected frequency, and then decremented, said computer means being responsive to clock signals produced by said counter means and, upon completion of decrementation of the words of each of said first and second plurality of word strings, said computer means producing pulse width modulation signal pulses and half cycle polarity signal pulses in accordance with said clock signals from said counter means.

3. The invention according to claim 2 wherein said computer means comprises a microcomputer.

4. The invention according to claim 1 wherein said storage means comprises:
- an output port coupled to said processing means for temporarily retaining inverter pulse width modulation signal pulses and half cycle polarity signal pulses produced by said computer means; and
- flip-flop means coupled to said processing means, said output port and to said inverter, said flip-flop means storing inverter pulse width modulation signal pulses and half cycle polarity signal pulses retained in said output port and releasing previously stored inverter pulse width modulation signal pulses and half cycle polarity signal pulses to said inverter upon receipt of clock signals from said counter means.

5. A pulse width modulator responsive to voltage and current commands comprising:
- a clock;
- a first counter coupled to said clock for providing pulses at a rate which is inversely proportional to the frequency command;
- a second counter coupled to said clock providing pulses at a rate which is a predetermined multiple of the pulses provided by said first counter;
- a third counter;
- means for generating a unit amplitude reference sine wave at the commanded frequency;
- means for sampling said reference sine wave at the first counter pulse rate when said frequency command is below a predetermined value;
- means for adjusting said sine wave sample by the voltage magnitude and storing the result in said third counter;
- a digital memory;
- means for fetching at a rate determined by said first counter a string of words stored in said digital memory indicative of pulse and notch width of a segment of the fundamental commanded period when said commanded frequency is above said predetermined value, said string of words fetched being dependent on said voltage magnitude commanded;
- means for storing the portion of each word indicative of pulse duration in said third counter;
- means for counting down said third counter at the second counter pulse rate to a predetermined value;
- means for providing an output pulse when said predetermined value is reached;
- means for providing a signal indicative of said output pulse polarity dependent on the polarity of said sine wave reference when said frequency command is below said predetermined value; and
- means for providing a signal indicative of said output pulse polarity dependent on the part of the word indicative of pulse polarity when said frequency command is above said predetermined value.

* * * * *